Dec. 3, 1957 G. T. SCHAEFFER ET AL 2,815,220
WHEELED CARRIER FOR CRATES
Filed April 17, 1956
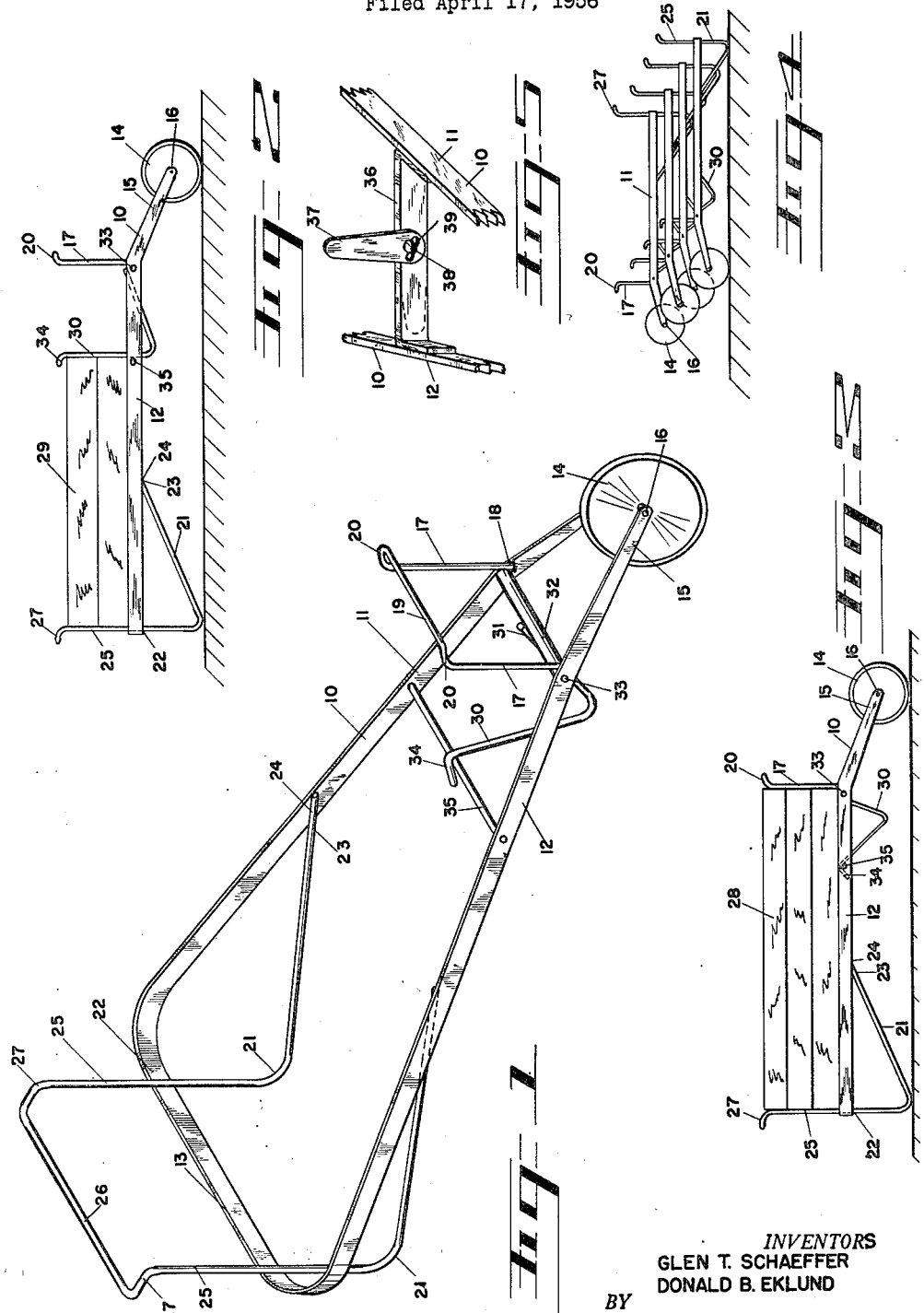
INVENTORS
GLEN T. SCHAEFFER
DONALD B. EKLUND
BY
Kimmel & Crowell
attorneys

United States Patent Office 2,815,220
Patented Dec. 3, 1957

2,815,220

WHEELED CARRIER FOR CRATES

Glen T. Schaeffer and Donald B. Eklund, Boring, Oreg.

Application April 17, 1956, Serial No. 578,799

1 Claim. (Cl. 280—47.3)

The present invention relates to a wheeled carrier for crates, and more particularly to a device of this character which is adapted for transporting berry crates in the handling of berries at the source and also in warehouses and the like.

The primary object of the invention of a wheeled carrier is to provide a simple, light and inexpensive carrier for transporting berry crates and the like.

A further object of the invention is to provide a wheeled carrier that will nest one within the other in the storage of the same.

A still further object of the invention is to provide a wheeled carrier that can be adapted to transport either large or small crates.

Other objects and advantages will become apparent in the following specification when considered in the light of the attached drawings, in which:

Figure 1 is a perspective view of our new and improved wheeled carrier for crates.

Figure 2 is a side elevation of the carrier supporting the smaller type of crates used in berry picking and having two crates illustrated in carrying position.

Figure 3 is a side elevation of the wheeled carrier shown supporting three of the larger crates to be transported.

Figure 4 is a side view of a group of carriers stacked one upon the other.

Figure 5 is a fragmentary perspective of a modified construction of the forward retaining stake.

Referring now to the drawings in detail wherein like reference characters refer to like parts throughout the several figures, the reference character 10 indicates a U-shaped flat bar frame forming a part of the invention. The frame 10 consists of converging frame members 11 and 12 joined integrally together by a cross member 13 at one end. A supporting wheel 14 is journalled between the opposite ends 15 of the side members 11 and 12 on a cross axle 16 mounted to extend between the frame members 11 and 12.

A U-shaped supporting stake 17 is fixedly secured in inverted relation to the frame members 11 and 12 at 18 at its open end and arranged with its cross member 19 extending transversely of the frame 10. The cross member 19 projects forwardly of the stake 17 at 20 so as to guide the load being carried on the carrier down between the stake 17, as illustrated particularly in Figure 3.

Legs 21 are fixedly secured to the frame 10 at 22 by welding or other suitable means. The forward ends 23 of the legs 21 are fixedly secured to the members 11 and 12 at 24 by welding or other suitable means. The legs 21 are extended upwardly in the form of stakes 25 and are joined together by a cross member 26. The cross member 26 is offset from the stake 25 by the short portions 27 bent rearwardly, as illustrated in Figure 2 of the drawings. The cross member 26 provides a handle for moving the cart from place to place.

When the device is used as shown in Figure 3, the large crates 28 rest on the top surface of the frame 10 and between the upwardly extending stakes 17 and the upwardly extending stakes 25 holding the crates 28 securely upon the carrier. When the carrier is being used for transporting smaller crates 29, referring particularly to Figure 2, a single stake 30 is brought up into the position shown. The stake 30 is fixedly secured at 31 to a tubular member 32. The tubular member 32 is journalled upon a cross shaft 33 which is fixedly secured within the side frames 11 and 12.

When the large crates 28 are being transported the stake member 30 is in the lowered position as illustrated in Figures 1, 3 and 4, the turned portion 34 supporting the same in the position illustrated upon the cross shaft 35.

Referring to Figure 5, a modified form of forward stake is illustrated wherein a cross frame member 36 extends between the side frames 11 and 12. Pivotally secured to the cross member 36 is a stake 37. The stake 37 is pivotally connected to the cross member 36 by bolt 38, which has a wing nut 39 for tightening the same so that the stake 37 can be held in a vertical position as illustrated, or can be folded down to the broken line position when not in use. When this latter form of the invention is used, the tubular member 32 and the stake 30 are removed.

The structure of this carrier is very light and inexpensive, requiring little space in which to store a great number of the carriers while not being used, as best illustrated in Figure 4.

Having thus described the preferred embodiments of the invention, it should be understood that numerous other modifications and structural adaptations may be resorted to without departing from the scope of the appended claim.

What is claimed is:

A wheeled carrier comprising a frame member having a pair of converging side members and an integral base member joining said side members at one end thereof, a wheel journalled between the converging ends of said side members, a pair of legs secured to said frame in depending relation thereto, a U-shaped combined load support and handle integrally formed as an upper extension of said legs, a forward U-shaped load support extending upwardly from said frame adjacent said wheel parallel to said first-mentioned load support, a cross bar pivotally mounted between said converging frame members adjacent said forward U-shaped load support, a second cross member mounted between said side members rearwardly of said first cross bar, and an auxiliary load support attached to said first cross bar for rotation therewith with said second cross bar supporting said load support in a lowered non-load engaging position.

References Cited in the file of this patent

UNITED STATES PATENTS

| | | |
|---|---|---|
| 555,584 | Pleukharp | Mar. 3, 1896 |
| 953,043 | Lyons | Mar. 29, 1910 |
| 2,578,793 | Fujita | Dec. 18, 1951 |
| 2,672,348 | Scott | Mar. 16, 1954 |

FOREIGN PATENTS

| | | |
|---|---|---|
| 206,440 | Great Britain | Nov. 8, 1923 |
| 580,222 | Great Britain | Aug. 30, 1946 |
| 80,912 | Netherlands | Feb. 16, 1956 |